(12) United States Patent
Mizukami et al.

(10) Patent No.: US 8,378,014 B2
(45) Date of Patent: Feb. 19, 2013

(54) SUSTAINED-RELEASE THERMOPLASTIC POLYMER COMPOSITION AND PRODUCT COMPRISING THE SAME

(75) Inventors: Yoshikatsu Mizukami, Osaka (JP); Eiji Akiba, Osaka (JP)

(73) Assignee: Sanc Salaam Corporation, Osaka-Shi Osaka (JP)

( * ) Notice: Subject to any disclaimer, the term of this patent is extended or adjusted under 35 U.S.C. 154(b) by 0 days.

(21) Appl. No.: 11/993,220

(22) PCT Filed: Jul. 12, 2006

(86) PCT No.: PCT/JP2006/313824
§ 371 (c)(1),
(2), (4) Date: Dec. 19, 2007

(87) PCT Pub. No.: WO2007/010787
PCT Pub. Date: Jan. 25, 2007

(65) Prior Publication Data
US 2009/0258973 A1    Oct. 15, 2009

(30) Foreign Application Priority Data

| | | | |
|---|---|---|---|
| Jul. 15, 2005 | (JP) | ............ | 2005-206894 |
| Dec. 27, 2005 | (JP) | ............ | 2005-373830 |
| Feb. 10, 2006 | (JP) | ............ | 2006-033191 |
| Feb. 24, 2006 | (JP) | ............ | 2006-047602 |
| Mar. 6, 2006 | (JP) | ............ | 2006-058876 |

(51) Int. Cl.
*C08L 25/06* (2006.01)
*C08L 25/02* (2006.01)

(52) U.S. Cl. ............ 524/505; 525/95; 525/98

(58) Field of Classification Search ............ 525/95, 525/98; 524/505; *C08L 25/06, 25/02*
See application file for complete search history.

(56) References Cited

U.S. PATENT DOCUMENTS

| | | | | |
|---|---|---|---|---|
| 3,674,765 A | * | 7/1972 | Carter et al. | 526/152 |
| 4,182,603 A | * | 1/1980 | Knittel | 425/133.1 |
| 4,410,595 A | * | 10/1983 | Matsumoto et al. | 428/412 |
| 5,571,582 A | * | 11/1996 | Katoh | 428/35.5 |
| 5,577,369 A | * | 11/1996 | Becker et al. | 53/474 |

(Continued)

FOREIGN PATENT DOCUMENTS

| | | |
|---|---|---|
| EP | 0 653 464 A2 | 5/1995 |
| EP | 0845490 A2 | 6/1998 |

(Continued)

OTHER PUBLICATIONS

JP 2000103934 A machine translated English equivalent, 9 pages.*

(Continued)

*Primary Examiner* — Ling Choi
*Assistant Examiner* — Brieann R Fink
(74) *Attorney, Agent, or Firm* — Roberts Mlotkowski Safran & Cole P.C.

(57) ABSTRACT

The polymer composition comprises a polymer and a liquid compound having poor compatibility with the polymer. When the liquid compound is caused to be held in the polymer in a high concentration, a block copolymer having in the molecule a copolymerized polymer block unit having high compatibility with both of the matrix polymer and the liquid compound is incorporated and dispersed. As a result, the block copolymer serves like a surfactant to form an interface and the liquid compound is enclosed inside the interface to thereby form a liquid-in-solid polymer type emulsion.

13 Claims, 3 Drawing Sheets

U.S. PATENT DOCUMENTS

| | | | | |
|---|---|---|---|---|
| 5,804,628 A | * | 9/1998 | Busnel et al. | 524/377 |
| 5,948,850 A | * | 9/1999 | Enami et al. | 524/515 |
| 6,653,401 B2 | * | 11/2003 | Kinoshita et al. | 525/70 |
| 7,160,508 B2 | * | 1/2007 | Lee | 422/28 |
| 8,178,611 B2 | * | 5/2012 | Mizukami et al. | 524/505 |
| 2004/0034149 A1 | * | 2/2004 | Garcia | 524/474 |

FOREIGN PATENT DOCUMENTS

| | | | | |
|---|---|---|---|---|
| JP | 49-53924 | A | | 5/1974 |
| JP | 49-92178 | A | | 9/1974 |
| JP | 58-12654 | A | | 1/1983 |
| JP | 6-316031 | A | | 11/1994 |
| JP | 8-41363 | A | | 2/1996 |
| JP | 10-87920 | A | | 4/1998 |
| JP | 10-168235 | A | | 6/1998 |
| JP | 2000-103934 | A | | 4/2000 |
| JP | 2000103934 | A | * | 4/2000 |
| JP | 2004-516353 | A | | 6/2004 |
| JP | 2004-516354 | A | | 6/2004 |
| JP | 2004-317763 | A | | 11/2004 |
| JP | 2004-360161 | A | | 12/2004 |
| JP | 2008-63365 | A | | 3/2008 |

OTHER PUBLICATIONS

Machine translated English equivalent of JP 10087920 A, Apr. 1998 (11 pages).*
Skane M-8 Mildewcide, Rohm and Haas, Sep. 2004 (14 pages).*
Vasile (Handbook of Polyolefins. 2nd Ed. Marcel Dekker, Inc. © 2000. p. 636).*
IUPAC definition of dispersion (2007).*
International Search Report of PCT/JP2006/313824 mailed Aug. 8, 2006.
Office Action dated May 31, 2010 issued by the Chinese Patent Office in corresponding Chinese Patent Application No. 200680025867.6.
Extended European Search Report in Corresponding European Application EP06780994 dated Dec. 28, 2010.

* cited by examiner

SUSTAINED-RELEASE THERMOPLASTIC POLYMER COMPOSITION AND PRODUCT COMPRISING THE SAME

TECHNICAL FIELD

The present invention relates to a sustained-release polymer composition containing a functional liquid compound, rapid bleeding of which is suppressed and which is sustainedly released such that the function of the liquid compound can last for a long period of time, and to a product formed from the composition.

BACKGROUND ART

In production of a molded article, such as a film, a sheet, a bottle or a fiber, made from a thermoplastic polymer as a raw material, the molded article is produced by adding to the material a functional organic compound such as an antioxidant, a thermal stabilizer, an ultraviolet ray absorbing agent or an antistatic agent and so on, and forming the mixture with a method such as an extrusion molding, a blow molding or an injection molding. Moreover, a molded product has been investigated which expresses a function by containing a functional compound, e.g., an odorous substance, an insecticide, a repellant or an antibacterial compound in a molded product and sustainedly releasing the functional compound from the molded product.

However, except for a plasticizer for vinyl chloride resin or a special example (Patent Document 1) in which an ethylene-vinyl acetate copolymer is swelled and contained with a solvent at a room temperature, a content of a liquid at a room temperature is remarkably small. As a compound other than the above examples, a liquid compound content, which can be contained in a general thermoplastic polymer, is limited in a range without a practical problem. And the state of such a liquid compound is not a droplet. Moreover, since the liquid compound is forcedly confined in the polymer as a phase separation state by melt-kneading process or others, the compound has no practical use because of a large amount of bleeding it out on a surface in a short period of time. On the other hand, a matter which contains a low content of a liquid compound disappears the liquid compound in such a short period of time as several weeks at most, and lacks a long-term duration of the function.

In order to aid diffusion of a volatile component to a surface, there is an example (Patent Document 2) which adds a hydrogenated diene-series polymer to a polypropylene to sustainedly release the volatile component. However, it is the self-evident truth that a disappearent rate of the volatile component increases as a diffusion rate is larger. Therefore, the above example is contradictory and is a theoretically impracticable proposal. Moreover, in the proposal, there is no description that the volatile component stably exists in the form of a liquid in a matrix polymer, and no description about compatibility between the additive and the matrix polymer at all.

A paint (or coating) includes a powdered paint and a liquid paint. As a powder coating for a thin film having about 50 μm, there are electrostatic spraying methods such as a corona system and a tribo system. In the corona system, a powder is electrostatically attached to a coated object by applying a high voltage (30-90 KV) on a corona pin provided with a tip of a gun for spraying the powder, and charging the powder (paint) released in the electric field between the pin and the object. In the tribo system, a powder is attached to a coated object by generating electrostatic charges with the friction between an inner wall of a gun and the powder when the powder passes through the inside of the gun.

A coated object to which a powdered paint is attached is baked in a furnace at 150 to 200° C. for 10 to 20 minutes so that the coating is finished. As a polymer component in the paint, thermoplastic and thermosetting polymers are used. The thermosetting polymer is often modified in an end thereof to enable combination use with a curing agent such as a urethane or epoxy curing agent.

As a powder coating method for coating a thick film, there are a fluidized bed coating method and an electrostatic spraying method. In the fluidized bed coating method a thermoplastic powdered paint is mainly used, and in an electrostatic spraying method a thermosetting powdered paint is mainly used. The fluidized bed coating method comprises suspending and floating of a powdered paint by a compressed air, and dipping of a pre-heated object to be coated in the floating paint. In this method, the floating paint is fused and adhered to the object to usually give a thick paint film by 200 to 500 μm thickness. The polymer for the thermoplastic powdered paint used in the fluidized bed coating method may include, for example, a polyvinyl chloride, a polyethylene, a polypropylene, a polyester, a nylon, and so on.

The generally used liquid paint is provided in an aqueous type and a solvent type. To such a liquid paint are blended a pigment, a dispersing agent (or dispersant), a stabilizer, a polymer, a crosslinking agent and others. The thickness of the film is 15 to 60 μm. Out of consideration to the environment, use of the aqueous type paint has increased. As the polymer to be blended, a thermoplastic or thermosetting polymer is used. For example, the polymer includes an alkyd polymer, an unsaturated polyester-series polymer, an epoxy-series polymer, a melamine-series polymer, an acrylic resin, a urethane-series polymer, a phenol-series polymer, a nylon-series polymer, an ester-series polymer, and a fluorocarbon resin.

The ship's bottom encrusted and fouled with extraneous matters such as a barnacle and so on increases friction with water, and is not economical in the running. For example, it has been suggested that an organic tin compound, copper oxide, mercury oxide, and others are used as an antifouling agent (Patent Documents 3 and 4). Moreover, in order to impart an antifouling property to a ship's bottom paint, an organic tin compound has been used by being mixed with the paint. However, since it has been known that an organic tin acts as an endocrine-disrupting chemical, such a compound has dropped out of use. Moreover, copper oxide and mercury oxide are also highly toxic compounds. On the other hand, many self polishing-type ship's bottom paints are commercially available. In these paints, it is considered that a fresh layer of the paint is constantly exposed by peeling off of the paint in the surface layer due to hydrolysis of the paint polymer, and decrease in the thickness of the paint film. However, since the ship's bottom is encrusted with the fouling matter until the surface layer peels off, it is inevitable that the effect of the paint is limited.

A highly safe antifouling agent may include an essential oil. The essential oil has been also used as a food additive over the years before Christ. However, the essential oil has intractability due to volatility. As a method for mixing a polymer and a volatile compound, there is a method which comprises allowing a porous powder such as a rubber component or a zeolite to contain a volatile component in advance, and mixing the resulting matter and the polymer temporarily. However, in such a method, although the polymer was temporarily allowed to contain the volatile component at a high concentration, it was difficult to sustainedly release the volatile component over a long period of time because of fast diffusion (or spread) of the volatile component. Further, the method had a shortcoming of increasing the diffusion rate as the surface area increases. Therefore, in a paint application for coating a large surface area with a thin film, the diffusion of the volatile component was fast.

Moreover, as an example for using a polymer having thermoplasticity in spite of containing water, there has been proposed a method which comprises mixing and allowing an inorganic substance (e.g., magnesium hydroxide, aluminum hydroxide and calcium silicate) to contain in the polymer, wherein the inorganic substance is in the form of a hydrate state (or has crystallization water) (Patent Document 5). However, since the crystallization water of the inorganic substance is released at a temperature as relatively high as 300 to 550° C., the method is disadvantageous in that the crystallization water does not act at a low temperature. It is impossible to allow the crystallization water to contain a solute therein.

Further, as a filter used for the purpose of dust collection, there is used a fabric such as a textile (a woven or knitted cloth) or a nonwoven fabric, a three-dimensionally assembled fiber structure, and others. The filter is considered to have higher performance as the filter has lower pressure loss and higher dust collection efficiency. In general, improvement of dust collection efficiency can be achieved to some extent by increasing a fiber density in the fabric or fiber structure, while the high fiber density results in a lower air permeability. Therefore, in order to ensure the air permeability in excess of a certain level to function as a filter, the dust collection efficiency is restricted.

In order to improve the dust collection efficiency while ensuring the air permeability in excess of a certain level, it is effective that the diameter of the fiber constituting the filter is small, and various filters using an ultra-fine fiber have been proposed. Moreover, it is also utilized to collect dust by electrostatic force. There has been utilized a meltblown nonwoven fabric made from an ultra-fine fiber, which is subjected to electreting for collecting dust through electrostatic induction by electrizing a filter itself. However, this electreting tends to neutralize the effect after exposure under a high temperature not lower than 50° C. or after a long time. Therefore, the filter had a propensity to be lack of washing resistance and durability.

Moreover, a method of collecting dust by a scrubber for water sprinkling has been also generally used. For example, a method for collecting dust by combination of a bag filter and a scrubber has been adopted for an incinerator flue gas. In a fine particle having a particle size of not larger than several micrometers, generally, a liquid bridging force is more dominant than an electrostatic force for the adherence of the fine particles. Thus, the scrubber utilizes effective collection of the fine particle due to the liquid bridging force of water.

As an example that the liquid bridging force is utilized for a filter itself, there is utilized a filter improved in a dust collection efficiency thereof, which comprises a fiber structure impregnated with a low-volatile oil component, wherein the fiber structure comprises staple fibers entangled by needle punch or others. However, the filter is limited to such a loose clearance one having a high air permeability that the oil component to be impregnated does not inhibit the air permeability.

Moreover, a fabric for a clean room wear has been proposed which comprises a fiber made from a polymer having a hydrous inorganic compound kneaded therein and has an improved dust collection efficiency with maintaining a relatively high air permeability by slightly coating the surface of the fiber with water (Patent Document 6). However, the high dust collection efficiency is limited to the case of an air flow rate as low as 0.09 cm/second. Therefore, in the case of a commonly used air filter having an air flow rate of 5 to 8 cm/second, an excellent dust collection efficiency cannot be expressed.

Patent Document 1: Japanese Patent Application Laid-Open No. S58-12654
Patent Document 2: Japanese Patent Application Laid-Open No. H10-87920
Patent Document 3: Japanese Patent Application Laid-Open No. S49-53924
Patent Document 4: Japanese Patent Application Laid-Open No. S49-92178
Patent Document 5: Japanese Patent Application Laid-Open No. H06-316031
Patent Document 6: Japanese Patent Application Laid-Open No. 2004-360161

DISCLOSURE OF INVENTION

Problems to be Solved by the Invention

In mixing a polymer and a liquid compound having a low compatibility with the polymer, a large amount of the liquid compound bleeds out from a surface of a product thereof. Therefore, it is practically difficult to mix the polymer and the liquid compound. Moreover, in the case where a large amount of the liquid compound having the low compatibility bleeds out in a short period of time, the duration of the effect is insufficient. A problem of the invention is to provide a sustained-release polymer composition which ensures a long-term duration of the function by enabling to add to a polymer a liquid compound having a low compatibility with the polymer at a high concentration in a stable state, and sustainedly releasing the compound over a long period of time; and a product therefrom.

Means for Solving the Problems

According to a composition of the present invention, to retain a liquid compound having low compatibility with polymers with a high concentration, a block copolymer which contains a matrix polymer, the liquid compound, and a polymer unit highly compatible with the matrix polymer and the liquid compound in the form of block copolymerization in one molecule is blended and dispersed. The block copolymer functions in a surfactant-like fashion to form an interface, in which emulsion containing the liquid compound therein is formed. Herein, the composition of the present invention is referred to as "liquid-in-solid polymer emulsion".

The present invention is directed to a composition which constitutes a liquid-in-solid polymer emulsion at room temperature, including: a thermoplastic polymer (A); 0.1 to 50 parts by weight of a block copolymer (B) mixed with 100 parts by weight of the thermoplastic polymer (A), the block copolymer (B) being phase-separated from the thermoplastic polymer (A); and 0.1 to 20 parts by weight of a liquid compound (C) dispersed in 100 parts by weight of the mixture of the thermoplastic polymer (A) and the block copolymer (B), wherein the block copolymer (B) contains a block (b1) having high compatibility with the thermoplastic polymer (A) but low compatibility with the liquid compound (C) and a block (b2) having high compatibility with the liquid compound (C) but low compatibility with the thermoplastic polymer (A), the liquid compound (C) has low compatibility with the block (b1) and the thermoplastic polymer (A) but high compatibility with the block (b2), the liquid compound (C) being phase-separated from the thermoplastic polymer (A) and being liquid at 100° C. or lower, the liquid compound (C) is enclosed by the block copolymer (B) by a surfactant-like function of the block copolymer (B), the thermoplastic polymer (A) is a polyolefin polymer, the block (b1) is a polyolefin block and the block (b2) is a polystyrene block, and the block copolymer (B) is at least one selected from the group consisting of a polystyrene-poly(ethylene/propylene) block copolymer, a polystyrene-poly(ethylene/butylene) block copolymer, a polystyrene-poly(ethylene/propylene)-polystyrene block copolymer, a polystyrene-poly(ethylene/butylene)-polystyrene block copolymer, and a polystyrene-poly(ethylene-ethylene/propylene)-polystyrene block copolymer. Hereinafter, this composition is sometimes referred to as "Composition (I)".

The present invention is also directed to another composition which constitutes a liquid-in-solid polymer emulsion at room temperature, including: a thermoplastic polymer (A); 0.1 to 50 parts by weight of a block copolymer (B) mixed with 100 parts by weight of the thermoplastic polymer (A), the block copolymer (B) being phase-separated from the thermoplastic polymer (A); and 0.1 to 20 parts by weight of a liquid compound (C) dispersed in 100 parts by weight of the mixture of the thermoplastic polymer (A) and the block copolymer (B), wherein the block copolymer (B) contains a block (b1) having high compatibility with the thermoplastic polymer (A) but low compatibility with the liquid compound (C) and a block (b2) having high compatibility with the liquid compound (C) but low compatibility with the thermoplastic polymer (A), the liquid compound (C) has low compatibility with the block (b1) and the thermoplastic polymer (A) but high compatibility with the block (b2), the liquid compound (C) being phase-separated from the thermoplastic polymer (A) and being liquid at 100° C. or lower, the liquid compound (C) is enclosed by the block copolymer (B) by a surfactant-like function of the block copolymer (B), the thermoplastic polymer (A) is a polystyrene polymer, the block (b1) is a polystyrene block and the block (b2) is a polyolefin block, and the block copolymer (B) is at least one selected from the group consisting of a polystyrene-poly(ethylene/propylene) block copolymer, a polystyrene-poly(ethylene/butylene) block copolymer, a polystyrene-poly(ethylene/propylene)-polystyrene block copolymer, a polystyrene-poly(ethylene/butylene)-polystyrene block copolymer, and a polystyrene-poly(ethylene-ethylene/propylene)-polystyrene block copolymer. Hereinafter, this composition is sometimes referred to as "Composition (II)".

Effects of the Invention

The present invention relates to a sustained-release composition containing a liquid compound which is liquid at 100° C. or lower, rapid bleeding of which is suppressed and which is sustainedly released such that the function of the liquid compound can last for a long period of time, and to a product formed from the composition.

Compositions of the present invention are used as materials for, for example, extrusion-molded articles, injection-molded articles, and rotational-molded articles, such as a fiber, a fabric or fiber product made of the fiber, a coating material, a covering material, paint, a pipe, a sheet, a film, and a laminate product, etc. The compositions of the present invention may contain, as the liquid compound, a pharmaceutical product, an antibacterial agent, an antifungal agent, an antiviral agent, an antistatic agent, an antialgal agent, a preservative, an aromatic agent, an insect repellent, an insecticide, a rodent repellent, a bird repellent, an animal repellent, an attractant, an agricultural chemical, an antifouling agent, a flame retardant, a dust-capturing agent, a fertilizer, or a deodorant, in which the function of the liquid compound can be sustained for several years. Further, according to the present invention, it is possible to form an extremely thin liquid coating having a thickness of 1 μm or less. The compositions of the present invention are also used for a high function filter which includes as a main dust-capturing material such fabric and fiber product, and a laminate thereof.

BEST MODE FOR CARRYING OUT THE INVENTION

Figure 1:
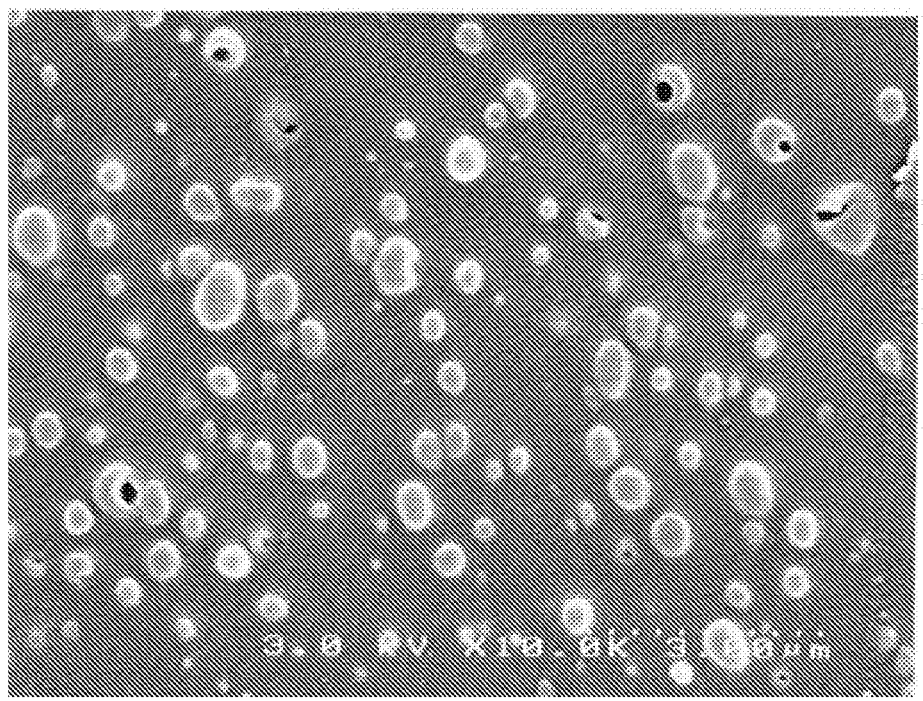
FIG. 1 is a scanning electron microphotograph of dispersed pellets (masterbatch) prepared in Example 1.

Compositions (I) and (II) each constitute a liquid-in-solid polymer emulsion at room temperature. The composition includes: a thermoplastic polymer (A); 0.1 to 50 parts by weight of a block copolymer (B) mixed with 100 parts by weight of the thermoplastic polymer (A), the block copolymer (B) being phase-separated from the thermoplastic polymer (A); and 0.1 to 20 parts by weight of a liquid compound (C) dispersed in 100 parts by weight of the mixture of the thermoplastic polymer (A) and the block copolymer (B), wherein the block copolymer (B) contains a block (b1) having high compatibility with the thermoplastic polymer (A) but low compatibility with the liquid compound (C) and a block (b2) having high compatibility with the liquid compound (C) but low compatibility with the thermoplastic polymer (A), the liquid compound (C) has low compatibility with the block (b1) and the thermoplastic polymer (A) but high compatibility with the block (b2), the liquid compound (C) being phase-separated from the thermoplastic polymer (A) and being liquid at 100° C. or lower, the liquid compound (C) is enclosed by the block copolymer (B) by a surfactant-like function of the block copolymer (B), the thermoplastic polymer (A) is a polyolefin polymer, the block (b1) is a polyolefin block and the block (b2) is a polystyrene block, and the block copolymer (B) is at least one selected from the group consisting of a polystyrene-poly(ethylene/propylene) block copolymer, a polystyrene-poly(ethylene/butylene) block copolymer, a polystyrene-poly(ethylene/propylene)-polystyrene block copolymer, a polystyrene-poly(ethylene/butylene)-polystyrene block copolymer, and a polystyrene-poly(ethylene-ethylene/propylene)-polystyrene block copolymer.

The present invention is also directed to a composition including: a dispersion medium; and Composition (I) or (II) constituting a liquid-in-solid polymer emulsion at room temperature which is dispersed in the dispersion medium, wherein the dispersion medium is any one of a polymer other than the thermoplastic polymer (A), a blend of the polymer other than the thermoplastic polymer (A) and a plasticizer, and a solution of the polymer other than the thermoplastic polymer (A). Hereinafter, this composition is sometimes referred to as "Composition (III)". Also, Compositions (I), (II) and (III) are generically referred to as "composition(s) of the present invention".

The present invention is directed to Composition (III) wherein the polymer other than the thermoplastic polymer (A) is a thermoplastic polymer, a thermosetting polymer or a thermosetting polymer precursor.

The present invention is directed to Compositions (I), (II) and (III) wherein the liquid compound (C) which is liquid at 100° C. or lower is an organic compound or an organic compound solution.

In Composition (I) of the present invention, the thermoplastic polymer (A) is a polyolefin polymer, the block (b1) is a polyolefin block which has high compatibility with the polyolefin polymer (thermoplastic polymer (A)) and the block (b2) is a polystyrene block which has high compatibility with the liquid compound (C), and the block copolymer (B) is at least one selected from the group consisting of a polystyrene-poly(ethylene/propylene) block copolymer (SEP), a polystyrene-poly(ethylene/butylene) block copolymer (SEB), a polystyrene-poly(ethylene/propylene)-polystyrene block copolymer (SEPS), a polystyrene-poly(ethylene/butylene)-polystyrene block copolymer (SEBS), and a polystyrene-poly(ethylene-ethylene/propylene)-polystyrene block copolymer (SEEPS).

In Composition (I) of the present invention, the liquid compound (C) is an organic compound or organic compound solution including an aromatic ring, alicyclic skeleton or polar group which has higher compatibility with polystyrene than with polyolefin.

In Composition (II) of the present invention, the thermoplastic polymer (A) is a polystyrene polymer, the block (b1) is a polystyrene block which has high compatibility with the polystyrene polymer (thermoplastic polymer (A)) and the block (b2) is a polyolefin block which has high compatibility with the liquid compound (C), and the block copolymer (B) is at least one selected from the group consisting of a polystyrene-poly(ethylene/propylene) block copolymer (SEP), a polystyrene-poly(ethylene/butylene) block copolymer (SEB), a polystyrene-poly(ethylene/propylene)-polystyrene block copolymer (SEPS), a polystyrene-poly(ethylene/butylene)-polystyrene block copolymer (SEBS), and a polystyrene-poly(ethylene-ethylene/propylene)-polystyrene block copolymer (SEEPS).

In Composition (II) of the present invention, the liquid compound (C) is an organic compound or organic compound solution which has higher compatibility with polyolefin than with polystyrene and which has low compatibility with a polystyrene, such as an alkyl or alkenyl or an ester or ether thereof or a polyether amine or alcohol.

In the compositions of the present invention, at least one of a pharmaceutical product, an antibacterial agent, an antifungal agent, an antiviral agent, an antistatic agent, an antialgal agent, a preservative, an aromatic agent, an insect repellent, an insecticide, a rodent repellent, a bird repellent, an animal repellent, an attractant, an agricultural chemical, an antifouling agent, a flame retardant, a dust-capturing agent, a fertilizer and a deodorant can be used for the liquid compound (C).

A molded article of the present invention is formed from Composition (I), (II) or (III). The molded article has a coating of the liquid compound (C) which has bled out of the composition, the coating having a thickness of 1 μm or less.

The molded article of the present invention is an extrusion-molded article formed from Composition (I), (II) or (III). Examples of the molded article include a fiber, a fabric or fiber product made of the fiber and a laminate of the same, a pipe, a sheet, a film, and a laminate molded article of the same.

Examples of the molded article of the present invention include an injection-molded article, a rotational-molded article, and a blow-molded article each of which is formed from Composition (I), (II) or (III).

The present invention is directed to a paint or coating material formed from Composition (I), (II) or (III). The present invention is also directed to a filter which includes as a main dust-capturing material the fabric, fiber product, or laminate formed from Composition (I), (II) or (III).

The thermoplastic polymer (A) is a polymer or elastomer moldable into a film, sheet, fiber, extrusion-molded article, etc. Examples of the thermoplastic polymer (A) include a polyolefin polymer, to which a liquid organic polymer is relatively difficult to add with high concentration. Specific examples of the thermoplastic polymer (A) include homopolymers, such as polyethylene, polypropylene, polystyrene, polyacrylate, polymethacrylate, poly(1-butene), poly(1-pentene) and polymethylpentene, and copolymers thereof. Among such candidates, the thermoplastic polymer (A) used in the composition of the present invention is preferably a polyolefin polymer or polystyrene polymer which has a low melting point and low reactivity. Using a high melting point polymer as the thermoplastic polymer (A) would result in a large difference between the melting point and the boiling point of the liquid compound added and hence a large loss of the liquid compound in molding, and thus entails use of a special quenching/loss-preventing device, such as an underwater cutter, for example.

In the compositions of the present invention, the block copolymer (B) is phase-separated from the thermoplastic polymer (A) which constitutes a matrix (hereinafter, sometimes referred to as "matrix polymer (A)") and is metastably dispersed in the matrix polymer (A) so that the block copolymer (B) forms an interface between the matrix polymer (A) and the liquid compound (C). The block copolymer (B) includes at least two polymer blocks: a block (b1) having high compatibility with the matrix polymer (A) but low compatibility with the liquid compound (C) and a block (b2) having high compatibility with the liquid compound (C) and low compatibility with the matrix polymer (A). In the compositions of the present invention, combination of materials used as the matrix polymer (A), the liquid compound (C) and the block copolymer (B) is a key to formation of a stable liquid-in-solid polymer emulsion.

The composition of the present invention contains 0.1 to 50 parts by weight of the block copolymer (B) relative to 100 parts by weight of the matrix polymer (A). In the case where the content of the block copolymer (B) is less than 0.1 part by weight, the absolute quantity of the liquid compound (C) contained in the liquid-in-solid polymer emulsion is small. As a result, a product of such a composition cannot have a sufficient function. On the other hand, the content of the block copolymer (B) more than 50 parts by weight is too much to form a desired liquid-in-solid polymer emulsion. The content of the block copolymer (B) is preferably 0.2 to 30 parts by weight relative to 100 parts by weight of the matrix polymer (A). In the composition, the content of the liquid compound (C) and the content of the block copolymer (B) correlate to each other.

Compositions (I) and (II) of the present invention are also used as masterbatches. In such cases, the content of the block copolymer (B) is preferably 4 to 25 parts by weight relative to 100 parts by weight of the matrix polymer (A), although it depends on the dilution ratio. Moreover, many of molded articles of the present invention are formed using a diluted masterbatch. The content of the block copolymer (B) in the molded product is preferably 0.2 to 2.5 parts by weight relative to 100 parts by weight of the matrix polymer (A).

In Composition (I) of the present invention where the matrix polymer (A) is a polyolefin polymer, the block copolymer (B) includes a polyolefin block as the block (b1) and therefore has excellent compatibility with the matrix polymer (A). Also, the block copolymer (B) includes a polystyrene block as the block (b2) and therefore has excellent compatibility with an aromatic or alicyclic compound of the liquid compound (C). The block copolymer (B) contained in Composition (I) is at least one selected from the group consisting of a polystyrene-poly(ethylene/propylene) block copolymer (SEP), a polystyrene-poly(ethylene/butylene) block copolymer (SEB), a polystyrene-poly(ethylene/propylene)-polystyrene block copolymer (SEPS), a polystyrene-poly(ethylene/butylene)-polystyrene block copolymer (SEBS), and a polystyrene-poly(ethylene-ethylene/propylene)-polystyrene block copolymer (SEEPS).

In the molten matrix polymer (A), the block copolymer (B) is phase-separated but metastably dispersed because of high compatibility with the matrix polymer (A) of the block (b1) of the block copolymer (B). The block copolymer (B) shows a surfactant-like behavior and constitutes an interface to form a liquid-in-solid polymer emulsion in which the liquid compound (C) having low compatibility with the matrix polymer (A) is enclosed in the copolymer (B). The emulsion is formed by a membrane of the block copolymer (B). The membrane is formed by two layers: the outer layer including a block (b1) which has high compatibility with the polymer (A) and the inner layer including a block (b2) which has high compatibility with the liquid compound (C). Forming such a liquid-in-solid polymer emulsion enables a large amount of liquid compound (C) to be stably contained therein such that it is kept in liquid form.

This liquid-in-solid polymer emulsion form is stably maintained even after solidification of the composition. Even after melted and sheared again in a closed system, the liquid-in-solid polymer emulsion form is re-formed and stably maintained. The liquid compound (C) is enclosed by a dense membrane of the block copolymer (B) such that the permeability of the liquid compound (C) through the block copolymer membrane is low and the liquid compound (C) is locally stored. Thus, this structure provides excellent sustained-release characteristics.

The liquid compound (C) used in the compositions of the present invention which is liquid at 100° C. or lower is preferably selected in view of such a combination with the matrix polymer (A) and the block (b1) of the block copolymer (B) that a stable liquid-in-solid polymer emulsion is formed. In particular, the liquid compound (C) selected preferably has low compatibility with and is phase-separated from the matrix polymer (A), but has high compatibility with the block (b1) of the block copolymer (B). Examples of the liquid compound (C) include an organic solution and an aqueous solution. Preferably, the liquid compound (C) used in Compositions (I) to (III) of the present invention is an organic solution. The liquid compound (C) is preferably liquid at 100° C. or lower, particularly at room temperature, in view of easy selection of a suitable dispersion rate of active components. An organic solution or aqueous solution wherein an organic compound which is solid at 100° C. or lower or an unmeltable compound, such as an inorganic compound, is dissolved in a solvent may be used for the present invention. Alternatively, using an organic solution of a low boiling point organic compound, or the like, ensures a decreased partial pressure and lower release rate.

Examples of the organic compound which is liquid at 100° C. or lower and can be used as the liquid compound (C) in the compositions of the present invention include: a natural essential oil, such as terpenes, and the like; a conifer essential oil, such as cedarwood oil containing a large quantity of thuyopsene with excellent insect repellency and tick repellency; a peppermint oil containing a large quantity of menthol with excellent rodent repellency; an eucalyptus oil with excellent antibacterial and antiviral properties and bronchodilatation effect; a lemongrass oil with excellent antifungal property; and a lavender oil with excellent aromatic property. The organic compound with agricultural chemical effects may be a pyrethroid compound insecticide or herbicide, such as permethrin, or the like. The organic compound with fertilization effects may be a low-molecular organic material containing amino acids. The organic compound with attraction effects may be an animal-attracting hormone derived from animals or plants. The organic compound with repellency may be capsaicin, limonene, or the like, which is repellent to animals. The organic compound with bactericidal effects may be triclosan. The organic compound with antifungal effects may be an isothiazoline compound. The organic compound with antibacterial effects may be zinc pyrithione. The preservative may be paraben, EDTA, or the like. The antistatic agent may be stearyl polyether monoglyceride, stearyl polyether diglyceride, stearyl aminopolyether, or the like.

The sustained release property and sustained release period of the functional liquid compound (C) can be controlled based on the amount of the liquid compound (C) contained, the compatibility, amount, and interfacial properties of the matrix polymer (A) and the block copolymer (B), and the ratio between the block copolymer (B) and the liquid compound (C), i.e., what liquid-in-solid polymer emulsion is formed.

The polymer compositions of the present invention may contain another additive without departing from the spirit of the present invention. The additive may be an inorganic filler, a pigment, a lubricant, a stabilizer, or the like.

Kneading of the polymer compositions of the present invention may be realized by a general melt-kneading method using a single rotor kneader with liquid dispenser or a twin rotor kneader which provides higher kneading efficiency. Alternatively, general extrusion molding, blow molding, injection molding, and rotational molding with such a machine may be directly employed.

Since the compositions of the present invention are in the state of finely dispersed emulsion, heating the liquid compound enclosed in the emulsion to its boiling point or higher only produces small expansion energy per emulsion droplet. Therefore, even at such a high temperature that the compositions are molten, expansion is suppressed due to the melt viscosity of the thermoplastic polymer (A) which constitutes the matrix, so that the compositions stay liquid and maintain their kneaded state. Even if such a system is in a high temperature environment equal to or higher than the atmospheric boiling point of water or aqueous solution, the emulsion droplets are maintained slightly swollen as compared with what they are when pressurized but only have small volumes so long as appropriate temperature and viscosity conditions are set in the system. Thereafter, the emulsion droplets are cooled to a temperature equal to or lower than the atmospheric boiling point to have smaller volumes along with transition from the pressurized state to the normal pressure state. As a result, the liquid compound is completely restored to liquid. More specifically, as will be described later in Examples, the liquid compound (C) may be mixed in the thermoplastic polymer (A) to form emulsion at a process temperature equal to or higher than its atmospheric boiling point, and the resultant mixture may be subjected to an extrusion process.

Compositions (I) and (II) of the present invention may be used as masterbatches. For example, the composition may be diluted with other matrix polymer to produce Composition (III). For example, a polymer processable at a low melting point, such as LDPE, or the like, may be used as the matrix polymer (A) (thermoplastic polymer (A)) together with the liquid compound (C) to produce a masterbatch of Composition (I) of the present invention. Composition (I) may be diluted with PP which has a high melting point to produce a finished product. In this case, a liquid-in-solid polymer emulsion composition (Composition (III)) having a double enclosure structure is formed as follows: islands of the LDPE are formed in the PP, and in the islands the liquid compound (C) is enclosed with the block copolymer (B) so that the liquid-in-solid polymer emulsion composition is formed, and the droplets of the emulsion composition are finely dispersed in the PP. It is also preferred to mix, as necessary, a compatibilizer suitable to stable blending of Composition (I) and the PP and improvement in strength due to fine blending.

The other matrix polymer used for dilution in the present invention can be selected from a wide range of candidates so long as stable production is ensured. With a material other than the above-described two similar types of polyolefins, for example, PET, a liquid-in-solid polymer emulsion having a double enclosure structure is formed in which islands of the LDPE are formed in the PET, and in the islands the liquid compound (C) enclosed by the copolymer (B) is contained; and a liquid-in-solid polymer emulsion having a double enclosure structure is formed in which islands of the LDPE are formed in the PVC, and in the islands the liquid compound (C) enclosed by the copolymer (B) is contained.

It is difficult to give a polymer composition which includes an aromatic polymer (e.g., a PET, a polystyrene) or a polymer using an aromatic plasticizer (e.g., a PVC) as the thermoplastic polymer (A) and mix an aromatic liquid compound (C) in the thermoplastic polymer (A) such that a polymer composition in the form of liquid-in-solid polymer emulsion because of high compatibility between the thermoplastic polymer (A) which constitutes the matrix and the liquid compound (C). However, the desired object of the present invention can be achieved by polyblending the polymer composition (I) in the form of liquid-in-solid polymer emulsion in which the aromatic liquid compound (C) is dispersed in polyolefin used as the thermoplastic polymer (A) which constitutes the matrix with a new matrix polymer, an aromatic polymer (e.g., a PET, a polystyrene) or a polymer using an aromatic plasticizer (e.g., a polyvinyl chloride), to form a double-enclosed liquid-in-solid polymer emulsion.

The other matrix polymer may be a polymer precursor. When a thermosetting novolak polyphenol resin precursor is used, a thermosetting liquid-in-solid polymer emulsion having a double enclosure structure is formed in which a liquid-in-solid polymer emulsion containing the liquid compound (C) enclosed by the copolymer (B) resides inside thermosetting polyphenol resin. Examples of the thermosetting resin used herein include xylene resins, urea resins, epoxy resins, melamine-urea resins, etc.

The other matrix polymer may be temporarily a polymer solution. For example, a liquid-in-solid polymer emulsion having a double enclosure structure is formed which includes a polyurethane liquid-in-solid polymer emulsion residing inside a polyacrylonitrile DMF solution.

A composition including the thermoplastic polymer (A) which constitutes a matrix, the block copolymer (B) and a biodegradable polymer as the other polymer can be formed into a product which possesses biodegradability and is therefore suitable to feeding of a long-acting pesticide or fertilizer.

The fiber of the present invention may be a staple, a filament, a tape yarn, or a short cut fiber, which is manufactured from a fiber produced by melt-spinning the composition of the present invention. The fiber of the present invention may be used to manufacture a thermally fused nonwoven fabric, a multilayer laminate, and a meltblown, spunbonded, needle punched, dry, wet, chemical bonded nonwoven fabric. Further, the fabric of the present invention may be a fabric produced by blend spinning, combining filament, yarn doubling, union weaving or union knitting the fiber of the present invention.

The fiber of the present invention may be used as a filling material for bedclothes or a pillow, a toy such as a doll, an interior textile product such as a curtain or a chair cover, and an insect repellant, tick repellant or insecticidal textile product such as a mosquito net, a screen door or clothes.

The molded article of the present invention may be a molded article produced by molding the composition of the present invention with the use of a common production method, for example, an injection molding, a blow molding, an extrusion molding or a rotational molding, and includes, for example, a container; a film produced by a common inflation method or T-die method; a sheet produced by a T-die method; a tank produced by a rotational molding; a coating material, a wire covering material, a laminate or a hose produced by an extrusion molding; and others.

The paint of the present invention includes a powdered paint including a fine particle obtained by freeze crushing the composition of the present invention, a paint containing the powdered fine particle, and a paint containing the powdered fine particle dissolved or dispersed in a solvent. The thermoplastic polymer (A) or/and the other polymer is preferably dissolved in the solvent or dispersion medium so that the paint maintains an appropriate viscosity.

The powdered paint is produced by mixing a pigment and if necessary an additive such as a surface control agent, a plasticizer, an ultraviolet ray absorbing agent, an antioxidant, an anti-popping agent, a static control agent, a curing catalyst, an antiblocking agent or a flow control agent to give a pellet, and pulverizing the pellet. The preferred pulverizing method includes a freeze mill or hammer pulverization utilizing a liquid nitrogen, and by such a method, a powder having a mean particle size of 100 µm or less is obtained. The painting method may be the above-mentioned common method. The pigment may include, for example, iron oxide, lead oxide, carbon black, titanium dioxide, talc, sulfated barium, cadmium yellow, cadmium red, chrome yellow, aluminum flake, and copper phthalocyanine blue. The pigment is not limited to these examples. Among these pigments, two or more pigments may be used together. The amount of the pigment blended is preferably from 0.5 to 40 wt %.

The liquid paint of the present invention is produced by suitably blending and mixing the powder of the present invention in the same manner as the pigment. In particular, it is advantageously preferred as a ship's bottom paint to have a large film thickness and a slight roughness on the surface of the paint film because the water disturbance can become small. The ship's bottom paint of the present invention containing Capsaicin or Cedarwood Virginia oil is effective for inhibiting growth of a fouling such as barnacle. Either component is a food additive, and a safe and eco-friendly component.

The liquid paint composition of the present invention is produced by heat-mixing the above-described paint of the present invention into a solvent for paint, such as toluene, xylene or n-hexane under pressure for finely dispersing the paint in the solvent in a molten state, and mixing the resulting matter with a thermosetting resin solution to a predetermined concentration to give a liquid paint composition having the above-mentioned function for use as a general paint. As compared with a conventional method using a microcapsule, a finer and more stable soft capsule is provided at a low price.

The filter of the present invention includes the fiber structure of the present invention having a fiber surface coated with the liquid compound (C) so that the liquid compound (C) forms a thin film having a thickness of 1 μm or less, and demonstrates a high degree of a fine dust collection efficiency by a liquid bridging force of the liquid. Dust is collected on the surface of the thin film by a strong adherence due to the liquid bridging force of the liquid. In the case of using the fiber structure as a filter, the structure exerts several tens times higher degree of the dust collection efficiency than a conventional filter while having the high air permeability and the low pressure drop. In the case of using the fiber structure as a wiping cloth, the structure exerts a performance for efficiently wiping off fine dust.

As a method for forming a thin film of the liquid compound (C) on the surface of the fiber, there is a method which comprises providing a solution of the organic compound dissolved in a high-volatile solvent, impregnating a fiber structure with the solution, and then volatilizing the solvent to leave the compound on the surface of the fiber. However, the method requires a great deal of expenses, and needs a complicated process such as the use of an apparatus for recovering a high-volatile solvent. Therefore, the method is not adequate to a practical industrial production. In the case of such finishing, the thin film of the liquid is removed once the fiber is washed, as a result, the effect of the liquid is lost. On the other hand, in the product of the present invention, a fresh liquid organic compound bleeds out from the inside thereof even after washing to form a thin film, and the function of the liquid is recovered.

EXAMPLES

Hereinafter, the following examples are intended to describe this invention in further detail and should by no means be interpreted as defining the scope of the invention.

(1) Measurement of Weight and GC

A molded article (molded pellet, fiber, or film) was put in a hot air dryer at 60° C. or 80° C., and the weight of the article was measured with time by a DTA-TGA analysis. Based on the weight loss, the amount of lost part of the functional organic compound (liquid compound) from the molded article was determined. In parallel, the concentration of the residual compound was measured by GC-2010 (manufactured by Shimadzu Corporation) in accordance with the trichlorobenzene hot extraction method.

(2) Observation of Emulsion

The surface to be observed was treated with ruthenium tetrachloride to stain an aromatic ring part, and the treated surface was observed by a scanning electron microscope (SEM).

Example 1

85 kg of polypropylene ("Y6005GM" manufactured by Prime Polymer Co., Ltd.) as the matrix polymer (A) and 10 kg of SEP ("SEP1001" manufactured by Kuraray Co., Ltd.) as the block copolymer (B) were ordinarily kneaded by a conventional biaxial extruder. While kneaded, the mixture was supplied with 5 kg of 1,3-diphenylpropane as the liquid compound (C), which was liquid at room temperature, via a plunger pump. The resultant mixture was extruded from the die head at 190° C. in the form of a cord. The cord-like mixture was quenched in water and cut with a cutter, such that granular pellets of Composition (I) of the present invention were produced.

The DTA-TGA measurement result of the pellets showed that the amount of residual 1,3-diphenylpropane was 4.57%, which was an excellent yield. The pellets were then put in a hot air dryer at 80° C. The weight of the pellets was measured before the pellets were put in the dryer and after 3 days, 7 days, 14 days, and 30 days. The weight loss was recorded for each measurement. The weight loss of 1,3-diphenylpropane remained at 72% even after 30 days, which meant good retention of the functional liquid (1,3-diphenylpropane). In view of such an evaluation criterion for tick repellent efficacy of carpets established by the Interior-fabrics Performance Evaluation Conference that a facilitated test under 81° C. for 3 days is equivalent to a test under atmospheric temperature for 3 years, it is appreciated that the pellets of Example 1 has excellent long-term effect sustainability. FIG. 1 is a SEM observation image, in which sea-islands each having a particle size smaller than 1 μm are observed, and the inside of the islands is hollow as seen through some corrupted islands. The cavity is a trace of evaporation of 1,3-diphenylpropane liquid from the inside of the membrane-ruptured island because of SEM observation carried out in vacuum and clearly indicates that a liquid-in-solid polymer emulsion structure was formed.

Example 2

Figure 2:
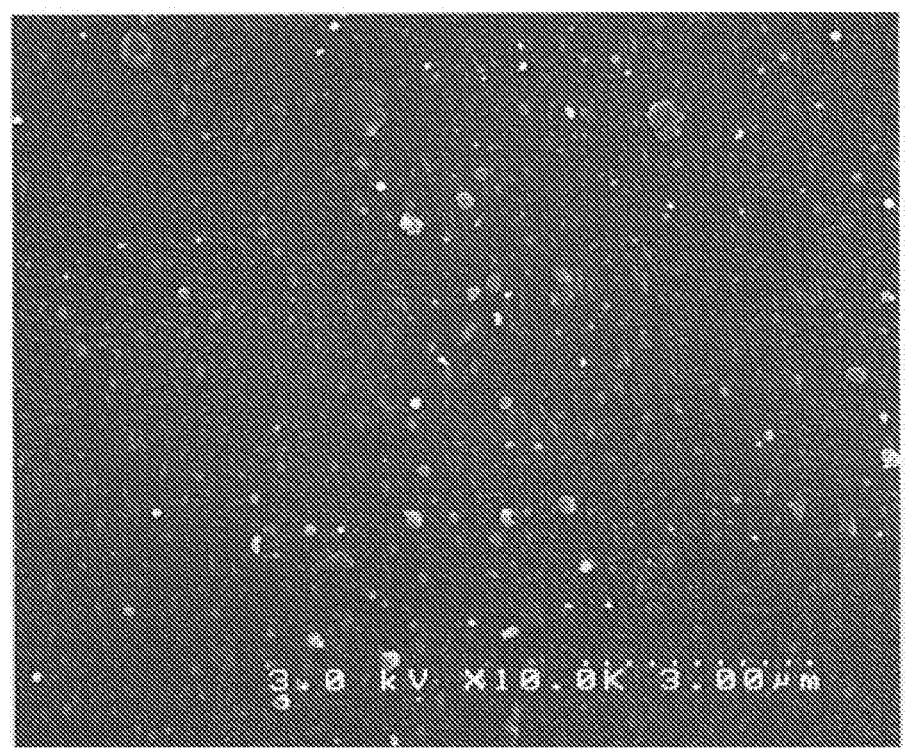
FIG. 2 is a scanning electron microphotograph of dispersed pellets (masterbatch) prepared in Example 2.

85 kg of LLDPE polymer ("NOVATEC LL" manufactured by Japan Polyethylene Corporation) as the matrix polymer (A) and 10 kg of SEPS ("SEPS2002" manufactured by Kuraray Co., Ltd.) as the block copolymer (B) were ordinarily kneaded by a conventional biaxial extruder. While kneaded, the mixture was supplied with 5 kg of Cedarwood oil having antibacterial, antifungal and insect-repellent effects as the liquid compound (C) via a plunger pump. The resultant mixture was extruded from the die head at 160° C. in the form of a cord. The cord-like mixture was quenched in water and cut with a cutter, such that granular pellets of Composition (I) of the present invention were produced. The DTA-TGA measurement result of the pellets showed that the amount of residual Cedarwood oil was 4.62%, which was an excellent yield. The pellets were then put in a dryer at 80° C. The weight of the pellets was measured before the pellets were put in the dryer and after 7 days. The weight loss was recorded for each measurement. The weight loss of Cedarwood oil remained at 46% even after 7 days, which meant good retention of the functional liquid (Cedarwood oil). FIG. 2 is a SEM observation image, in which islands smaller than those observed in FIG. 1 are observed, and the inside of the islands is hollow as seen through some corrupted islands. It is appreciated from comparison with Example 1 that the liquid-in-solid polymer emulsion structure depends on the matrix polymer (A), the block copolymer (B) and the liquid compound (C).

Example 3

As in Example 2, 85 kg of LLDPE polymer ("NOVATEC LL" manufactured by Japan Polyethylene Corporation) as the matrix polymer (A) and 15 kg of SEPS ("SEPS2002" manufactured by Kuraray Co., Ltd.) as the block copolymer (B) were ordinarily kneaded by a conventional biaxial extruder. While kneaded, the mixture was supplied with 5 kg of Peppermint oil as the liquid compound (C) via a plunger pump. The resultant mixture was extruded from the die head at 160°

Figure 3:
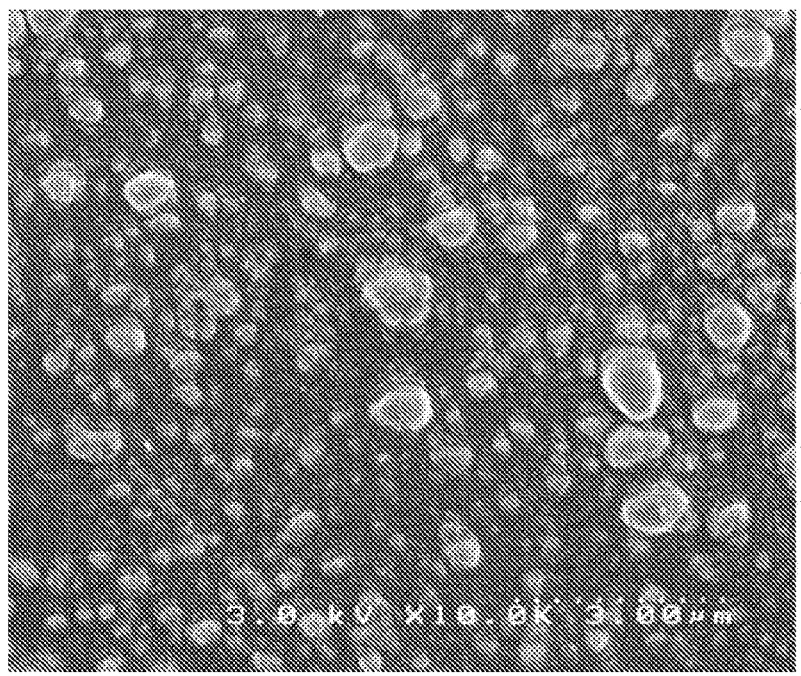
FIG. 3 is a scanning electron microphotograph of dispersed pellets (masterbatch) prepared in Example 3.

C. in the form of a cord. The cord-like mixture was quenched in water and cut with a cutter, such that granular pellets of Composition (I) of the present invention were produced. The DTA-TGA measurement result of the Peppermint oil itself while the temperature was gradually increased from room temperature showed that the weight of the Peppermint oil was almost lost before 156° C. On the other hand, the DTA-TGA measurement result of the pellets of Example 3 showed that the amount of residual Peppermint oil was 4.42%, which was an excellent yield even though the temperature of the die head was higher than the evaporation temperature of the Peppermint oil. The pellets were then put in a dryer at 80° C. The weight of the pellets was measured before the pellets were put in the dryer and after 7 days. The weight loss was recorded for each measurement. The weight loss of Peppermint oil remained at 53% even after 7 days, which meant good retention of the functional liquid (Peppermint oil). FIG. 3 is a SEM observation image, in which islands greater than those observed in FIG. 2 are observed, and the inside of the islands is hollow as seen through some corrupted islands. It is appreciated that the liquid-in-solid polymer emulsion structure depends on the liquid compound (C) even though the matrix polymer (A) and the block copolymer (B) are the same.

Example 4

As in Example 2, 85 kg of LLDPE polymer ("NOVATEC LL" manufactured by Japan Polyethylene Corporation) as the matrix polymer (A) and 10 kg of SEPS ("SEPS2002" manufactured by Kuraray Co., Ltd.) as the block copolymer (B) were ordinarily kneaded by a conventional biaxial extruder. While kneaded, the mixture was supplied with 5 kg of Eucalyptus oil as the liquid compound (C) via a plunger pump. The resultant mixture was extruded from the die head at 160° C. in the form of a cord. The cord-like mixture was quenched in water and cut with a cutter, such that granular pellets of Composition (I) of the present invention were produced. The DTA-TGA measurement result of the pellets showed that the amount of residual Eucalyptus oil was 4.58%, which was an excellent yield.

Comparative Example 1

The conditions for Comparative Example 1 were basically the same as those of Example 1 except that the block copolymer (B) was not added. Specifically, while 100 kg of polypropylene ("Y6005GM" manufactured by Prime Polymer Co., Ltd.) was ordinarily kneaded by a conventional biaxial extruder, 5 kg of 1,3-diphenylpropane was added thereto via a plunger pump. The resultant mixture was extruded from the die head in the form of a cord. The cord-like mixture was quenched in water and cut with a cutter, such that granular pellets of the comparative composition were produced. A phase-separated portion of 1,3-diphenylpropane burst from the die head, and the resultant pellets were soaked in a large amount of 1,3-diphenylpropane that has bled out. Therefore, the pellets were aggregated together and were not usable for the next step.

Example 5

As in Example 2, 85 kg of LLDPE polymer ("NOVATEC LL" manufactured by Japan Polyethylene Corporation) as the matrix polymer (A) and 15 kg of SEPS ("SEPS2002" manufactured by Kuraray Co., Ltd.) as the block copolymer (B) were ordinarily kneaded by a conventional biaxial extruder. While kneaded, the mixture was supplied with 5 kg of insecticide Permethrin as the liquid compound (C) via a plunger pump. The resultant mixture was extruded from the die head at 160° C. in the form of a cord. The cord-like mixture was quenched in water and cut with a cutter, such that granular pellets of Composition (I) of the present invention were produced. The GC measurement result of the pellets showed that the amount of residual Permethrin was 4.68%, which was an excellent yield.

Example 6

Figure 4:
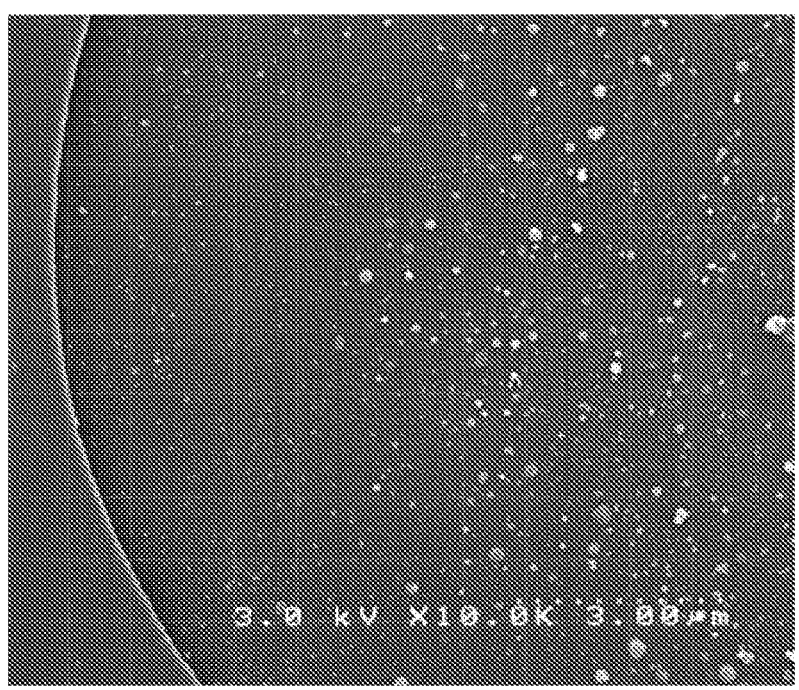
FIG. 4 is a scanning electron microphotograph showing a cross section of a multifilament prepared in Example 4.

10 parts by weight of the pellets (masterbatch) prepared in Example 5 and 90 parts by weight of PP pellets were mixed and subjected to a spin-draw melt-spinning process at the spinning temperature of 230° C., such that PP multifilaments of 110 dTex/24 F were produced. The GC measurement result of the filaments showed that the amount of residual Permethrin was 0.37%, which was an excellent yield, even though the filaments were heated twice. The filaments also exhibited excellent mechanical properties: the tensile strength of 4.2 g/dTex and the tensile elongation of 70%. The filaments were knitted into a tricot mosquito net fabric of the present invention. The fabric exhibited such an excellent knockdown effect that 50% knockdown time of mosquitoes (*Culex pipiens*) based on the WHO kit method was 16 minutes. FIG. 4 is a cross-sectional SEM observation image of the multifilament of Example 6, in which fine sea-islands are observed, and it is confirmed that the liquid-in-solid polymer emulsion structure was re-formed after the re-melting/re-spinning process.

Example 7

10 parts by weight of the pellets (masterbatch) prepared in Example 2 and 90 parts by weight of PP pellets were mixed and subjected to a common melt-spinning process, such that PP BCF multifilaments of 1650 dtex/96 F were produced. The GC measurement result of the filaments showed that the amount of residual Cedarwood oil was 0.36%, which was an excellent yield, even though the filaments were heated twice. The BCF multifilaments were used to manufacture a loop pile tufted carpet of 1 kg/m². The manufacture of the carpet included the third heating process of baking a backing material. The carpet exhibited 86% repellency to *Dermatophagoides farinae*, which means excellent repellency to ticks.

Example 8

20 parts by weight of the pellets (masterbatch) prepared in Example 3 and 80 parts by weight of HDPE pellets were mixed and subjected to a common T-die process at the die temperature of 190° C. to produce a film. The film was slit to produce a tape yarn of 1450 dTex. The GC measurement result of the tape yarn showed that the amount of residual Peppermint oil was 0.36%, which was an excellent yield. The tape yarn was used as warp and a common HDPE tape yarn was used as weft to fabricate a plane circular-woven hessian fabric. A rat food was wrapped in the hessian fabric and placed in a breeding cage of rats. For 5 *Rattus norvegicus caraco* of 17-week-old, whether or not they had eaten the food was checked after 3 days and nights. Before the end of the first day, no rats ate the food. Before the end of the second day, only two rats ate the food. This result means that the fabric exhibited excellent rodent repellency. As for a blank sample placed in the same cage, 3 rats ate the food before the end of the first day, and the food were all eaten before the end of the second day.

Example 9

10 parts by weight of the pellets (masterbatch) prepared in Example 1 and 10 parts by weight of polypropylene ("Y6005GM" manufactured by Prime Polymer Co., Ltd.) were mixed and subjected to common melt-extrusion and melt-blowing processes to produce a meltblown nonwoven fabric filter having a weight of 22 g/cm$^2$. The resultant fabric was subjected to a quartz dust collection efficiency test (test conditions: quartz dust having a particle size of 1.0 μm; wind velocity of 8.6 cm/second). The result of the test indicated that the dust collection efficiency of the meltblown nonwoven fabric was about twice as high as that of a common meltblown nonwoven fabric with the same level of pressure loss (about 16 Pa).

Example 10

85 kg of polystyrene ("GPPS679" manufactured by PS Japan Corporation) as the matrix polymer (A) and 10 kg of SEP ("SEP2014" manufactured by Kuraray Co., Ltd.) as the block copolymer (B) were ordinarily kneaded by a conventional biaxial extruder. While kneaded, the mixture was supplied with 5 kg of antistatic agent, polyoxyethylene stearylamine, as the liquid compound (C) via a plunger pump. The resultant mixture was extruded from the die head at 190° C. in the form of a cord. The cord-like mixture was quenched in water and cut with a cutter, such that granular pellets of Composition (II) of the present invention were produced. The DTA-TGA measurement result of the pellets showed that the amount of residual polyoxyethylene stearylamine was 4.67%, which was an excellent yield. The pellets (masterbatch) were diluted tenfold with LDPE (E), and an inflation film was produced from the dilution by a common method. The surface resistance of the film was measured according to JIS K 6911 under the following conditions: applied voltage of 500 V; 20° C.; and 40% RH. The result was $1.2 \times 10^{11} \Omega$, which means sufficient anti-dust adhesion as compared with a blank sample whose result was $2.5 \times 10^{15} \Omega$.

Example 11

Figure 5:
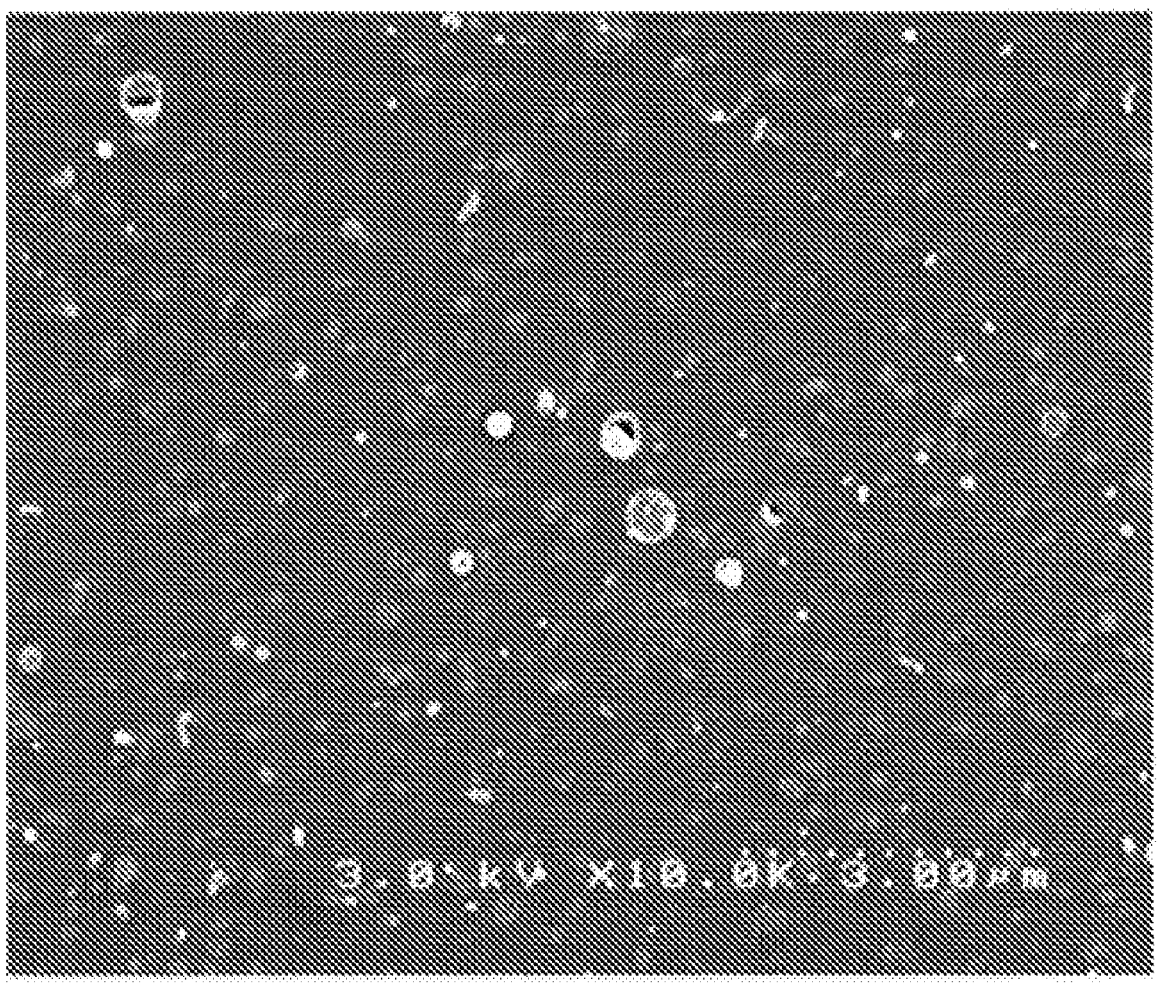
FIG. 5 is a scanning electron microphotograph of dispersed pellets (masterbatch) prepared in Example 5.

40 parts by weight of the pellets (masterbatch) prepared in Example 2, 30 parts by weight of polyvinyl chloride powder having a molecular weight of about 2000, and 30 parts by weight of plasticizer, 1,2-di-2-ethylhexyl phthalate (hereinafter, referred to as "DOP"), were kneaded at 140° C. by a biaxial extruder. The resultant mixture was extruded from the die head in the form of a cord. The cord-like mixture was quenched in water and cut with a cutter, such that soft polyvinyl chloride pellets of Composition (III) of the present invention, in which LDPE polymer composition was polyblended, were produced. The surface of the pellets were obviously a dry-touch surface, and bleeding out of the Cedarwood oil was not recognized in appearance. The amount of residual Cedarwood oil in the pellets was 1.83% by weight, which was a high yield. FIG. 5 is a cross-sectional SEM observation image of the pellets of Example 11, in which fine sea-islands are observed, and it is confirmed that the liquid-in-solid polymer emulsion structure was re-formed after the re-melting process to form a double enclosure structure even though a large amount of DPO which is highly compatible with Cedarwood oil was contained in the matrix polymer.

Example 12

The pellets (masterbatch) prepared in Example 11 were diluted fourfold with polyvinyl chloride and plasticizer DOP of equal amounts, and an inflation film having a thickness of 60 μm and a width of 2 m was produced from the dilution by a common inflation film method. The surface of the film was obviously a dry-touch surface, and bleeding out of the Cedarwood oil was not recognized in appearance. The amount of residual Cedarwood oil in the pellets was 0.37% by weight, which was a high yield.

Example 13

10 parts by weight of the pellets (masterbatch) prepared in Example 2 and 90 parts by weight of dried PET pellets having an IV value of 0.70 were mixed and melted by a mixer/extruder. The mixture was measured by a gear pump and spun according to a spin-draw method at a die temperature of 270° C. to produce multifilaments of 165 dTex/48 F. The amount of residual Cedarwood oil in the filaments was 0.41% by weight, which was a high yield. The filaments were dyed in black according to a common high-pressure dyeing method. The dyed filaments were subjected to an antibacterial test according to JIS L1902 bacterial suspension absorption method. The test result was such that the value of bacteriostatic activity to *Staphylococcus aureus* was 2.8, which means excellent antibacterial effect.

Example 14

20 kg of the pellets (masterbatch) prepared in Example 2 and 80 kg of LDPE containing 50% by weight of titanium oxide were mixed, to which an adequate amount of a suitable additive was ordinarily added. The mixture was kneaded by biaxial extruder. The resultant mixture was extruded from the die head in the form of a cord. The cord-like mixture was cooled and cut with a cutter into pellets. The pellets were pulverized while cooled with liquid nitrogen such that white powdered paint having a mean particle size of 63 micrometers was produced. The GC measurement result of the powdered paint showed that the amount of residual Cedarwood oil was 1.09%, which was an excellent yield. The powdered paint was applied by electrostatic spraying over a clean iron plate (2 mm thick; width×length=10 cm×20 cm) pretreated with zinc phosphate. The iron plate was heated to 200° C. for 10 minutes to form a coating of 30 μm thick. The coating adhered firmly to the iron plate, which was sufficient coating strength for practical use. The iron plate was subjected to an antifungal test in accordance with JIS Z2911 2000 wet process with mixture of four types of fungi. The result of the test was such that growth of hypha was not detected in an area inoculated with the fungi even after two weeks.

Example 15

10% by weight of the powdered paint prepared in Example 14 was mixed in a commercially-available water base paint (general-purpose aqueous EG manufactured by Kansai Paint Co., Ltd.) by a mixer. The viscosity of the mixture was adjusted with water to prepare a liquid paint. The paint was coated over a piece of wood to form a coating of 100 gr/m$^2$ thick. The coated wood piece was dried and subjected to a antifungal test in accordance with JIS Z2911 2000 wet process with mixture of four types of fungi. The result of the test was such that growth of hypha was not detected in an area inoculated with the fungi even after two weeks.

The invention claimed is:
1. A composition which constitutes a liquid-in-solid polymer emulsion at room temperature, comprising:

a thermoplastic polymer matrix (A) selected from the group consisting of polyethylene, polypropylene, polystyrene, polyacrylate, polymethacrylate, poly(1-butene), poly(1-pentene), polymethylpentene and copolymers thereof;

0.1 to about 18 parts by weight of a block copolymer (B) dispersed in 100 parts by weight of the thermoplastic polymer (A) in the form of islands of (B) in the sea of (A); and 0.1 to 20 parts by weight of a liquid compound (C) per 100 parts by weight of the mixture of thermoplastic polymer (A) and block copolymer (B), wherein the islands of the block copolymer (B) encapsulate the liquid compound (C) within the thermoplastic polymer matrix (A), and the islands have a two-layer structure including an outer coat layer made of the block copolymer (B) and a core layer made of the liquid compound (C), and the liquid compound (C) has a low compatibility with the thermoplastic polymer (A) and is phase-separated from the thermoplastic polymer (A).

2. The composition of claim 1, wherein the liquid compound (C) is an organic compound or organic compound solution.

3. The composition of claim 1, wherein the liquid compound (C) is an organic compound or organic compound solution including an aromatic ring, alicyclic skeleton or polar group which has higher compatibility with polystyrene than with polyolefin.

4. A composition, comprising:
a dispersion medium; and
the composition of claim 1 constituting a liquid-in-solid polymer emulsion at room temperature which is dispersed in the dispersion medium,
wherein the dispersion medium is any one of
a polymer other than the thermoplastic polymer (A),
a blend of the polymer other than the thermoplastic polymer (A) and a plasticizer, and
a solution of the polymer other than the thermoplastic polymer (A).

5. The composition of claim 4, wherein the polymer other than the thermoplastic polymer (A) is a thermoplastic polymer and/or a thermosetting polymer or thermosetting polymer precursor.

6. The composition of claim 1, wherein the liquid compound (C) is at least one of a pharmaceutical product, an antibacterial agent, an antifungal agent, an antiviral agent, an antistatic agent, an antialgal agent, a preservative, an aromatic agent, an insect repellent, an insecticide, a rodent repellent, a bird repellent, an animal repellent, an attractant, an agricultural chemical, an antifouling agent, a flame retardant, a dust-capturing agent, a fertilizer and a deodorant.

7. A molded article formed from the composition of claim 1, wherein the molded article has a coating of the liquid compound (C) which has bled out of the composition, the coating having a thickness of 1 μm or less.

8. The molded article of claim 7 which is an extrusion-molded article.

9. The molded article of claim 7 which is a fiber, a fabric or fiber product made of the fiber, or a laminate of the same.

10. The molded article of claim 7 which is a pipe, a sheet, a film, and a laminate of the same.

11. The molded article of claim 7 which is an injection-molded article, a rotational-molded article, or a blow-molded article.

12. A paint or coating material, comprising the composition of claim 1 or a mixture or dilution of the same.

13. A filter, comprising the fabric or fiber product or the laminate of claim 9 as a main dust-capturing material.

* * * * *

UNITED STATES PATENT AND TRADEMARK OFFICE
CERTIFICATE OF CORRECTION

PATENT NO. : 8,378,014 B2
APPLICATION NO. : 11/993220
DATED : February 19, 2013
INVENTOR(S) : Yoshikatsu Mizukami and Eiji Akiba It is certified that error appears in the above-identified patent and that said Letters Patent is hereby corrected as shown below:

Title Page, Item (73) Assignee should read as follows:

-- SANC SALAAM CORPORATION, OSAKA-SHI OSAKA (JP)

KURARAY LIVING CO., LTD, OSAKA-SHI OSAKA (JP) --.

Signed and Sealed this
Second Day of July, 2013

Teresa Stanek Rea
*Acting Director of the United States Patent and Trademark Office*